(12) United States Patent
Hiromatsu (10) Patent No.: US 8,129,760 B2
(45) Date of Patent: Mar. 6, 2012

(54) IMAGE SENSOR AND IMAGE READING APPARATUS

(75) Inventor: Kenji Hiromatsu, Chiba (JP)

(73) Assignee: Canon Kabushiki Kaisha (JP)

( * ) Notice: Subject to any disclaimer, the term of this patent is extended or adjusted under 35 U.S.C. 154(b) by 330 days.

(21) Appl. No.: 12/189,819

(22) Filed: Aug. 12, 2008

(65) Prior Publication Data

US 2008/0303934 A1 Dec. 11, 2008

Related U.S. Application Data

(63) Continuation of application No. 11/459,150, filed on Jul. 21, 2006, now Pat. No. 7,477,432, which is a continuation of application No. 10/192,126, filed on Jul. 9, 2002, now Pat. No. 7,158,272.

(30) Foreign Application Priority Data

Jul. 12, 2001 (JP) ................................. 2001-212036

(51) Int. Cl.
*H01L 27/148* (2006.01)
(52) U.S. Cl. .. 257/222; 257/231; 257/241; 257/E27.154
(58) Field of Classification Search .................. 257/231, 257/222, 241, E27.154; 358/514
See application file for complete search history.

(56) References Cited

U.S. PATENT DOCUMENTS

| | | | |
|---|---|---|---|
| 4,506,299 A | 3/1985 | Berger et al. | |
| 4,870,483 A | 9/1989 | Nishigaki et al. | |
| 4,992,860 A | 2/1991 | Hamaguchi et al. | |
| 5,148,268 A | 9/1992 | Tandon et al. | |
| 5,418,387 A | 5/1995 | Nakamura et al. | |
| 5,856,832 A * | 1/1999 | Pakenham et al. | ............ 345/540 |
| 5,909,235 A * | 6/1999 | Folkins | ......................... 347/240 |
| 6,005,689 A | 12/1999 | Miyasaka | |
| 6,055,072 A | 4/2000 | Tabata et al. | |
| 6,115,139 A | 9/2000 | Hosier et al. | |
| 6,195,183 B1 | 2/2001 | Fujimoto et al. | |

(Continued)

FOREIGN PATENT DOCUMENTS

EP        0 449 637        10/1991

(Continued)

OTHER PUBLICATIONS

Office Action issued in corresponding Japanese Patent Application No. 2001-212036 dated Apr. 13, 2010.

*Primary Examiner* — Wael Fahmy
*Assistant Examiner* — John C Ingham
(74) *Attorney, Agent, or Firm* — Rossi, Kimms & McDowell LLP (57) ABSTRACT

A structure which meets a high-quality reading requirement and realizes high-speed color reading when the reading section of a color image forming apparatus adopts a color contact image sensor using CCDs as reading element arrays is disclosed. The image sensor of a color image reading section uses a color contact image sensor in which a plurality of CCDs are aligned as reading element arrays in the main scanning direction. In this case, each CCD has one analog shift register for RGB time-division reading, and three R, G, and B reading apertures arranged parallel to each other at a pitch corresponding to the reading resolution. The pixel pitch in the main scanning direction is constant.

9 Claims, 11 Drawing Sheets

U.S. PATENT DOCUMENTS 6,801,345 B1 10/2004 Imamura
7,158,272 B2 * 1/2007 Hiromatsu .................... 358/514
7,477,432 B2 * 1/2009 Hiromatsu .................... 358/514

FOREIGN PATENT DOCUMENTS

| | | |
|---|---|---|
| EP | 0 662 765 | 7/1995 |
| JP | 57-181279 A | 11/1982 |
| JP | 4-068790 A | 3/1992 |
| JP | 6-311302 A | 11/1994 |
| JP | 07-203198 | 8/1995 |
| JP | 10-093764 A | 4/1998 |
| JP | 11-026744 A | 1/1999 |
| KR | 1999-85269 | 12/1999 |

* cited by examiner

IMAGE SENSOR AND IMAGE READING APPARATUS

CROSS-REFERENCE TO RELATED APPLICATIONS

This application is a continuation of U.S. application Ser. No. 11/459,150 (now U.S. Pat. No. 7,477,432), filed Jul. 21, 2006, and entitled, "IMAGE SENSOR AND IMAGE READING APPARATUS" which is a continuation of U.S. application Ser. No. 10/192,126 (now U.S. Pat. No. 7,158,272), filed on Jul. 9, 2002, to which priority under 35 U.S.C. §120 is claimed. The disclosures of U.S. Pat. Nos. 7,477,432 and 7,158,272 are hereby incorporated herein by reference. This application also claims priority to Japanese Patent Application No. 2001-212036, filed on Jul. 12, 2001.

FIELD OF THE INVENTION

The present invention relates in general to an image sensor and an image reading apparatus including the same.

BACKGROUND OF THE INVENTION

Recent development of so-called digital color copying machines which separate a color document into colors, electrically read the document, print the obtained color image data on a sheet, and thus copy the color image is outstanding. With the popularization of digital color copying systems, demands have arisen for higher printing qualities of color images.

Particularly, a demand for printing black characters and thin black lines more black and shaper is strong. When a black document is separated into colors, yellow, magenta, cyan, and black color signals are generated as signals which reproduce black, and data is printed based on the obtained color signals. Black is reproduced by superposing the four colors, and thus even slight misregistration between the colors smears a thin black line. An originally black image cannot look black or blurs, greatly degrading the printing quality.

To increase the printing quality, there is proposed a method of, e.g., extracting color information in an image signal or the feature of the special frequency such as a thin line or dot to detect the area of a black character, color character, or the like. Further, the image is separated into areas such as a halftone image area and dot image area, and the respective areas undergo corresponding processes. For example, if the area is a black character portion, the area is monochromated in black.

To meet demands for cost reduction and reduction in power consumption of the light source, so-called contact image sensors (to be referred to as CISs hereinafter) are being utilized more and more. This CIS uses a light source such as an LED or xenon lamp, an equal-magnification imaging optical system such as a SELFOC lens, and a CCD or CMOS line sensor, in addition to an image scanner using a reduction optical system as a combination of CCDs and lenses.

For example, when a document is read by a color copying machine at a reading rate of about 25 ipm (images/min), the reduction optical system using CCDs requires a document surface illuminance of about 30,000 lx. To the contrary, the examination results reveal that the use of the contact image sensor needs only a document surface illuminance of about 3,000 lx which is about 1/10 that of the reduction optical system, and can offer the same S/N in reading at the same reading rate.

Figure 10:
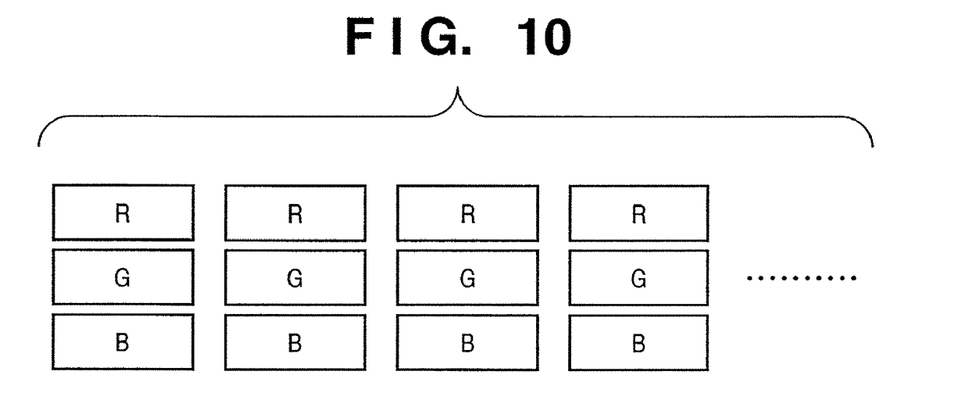
FIG. 10 is a view for explaining a color CIS in which one pixel is divided into three, R, G, and B colors in the subscanning direction.
Figure 11:
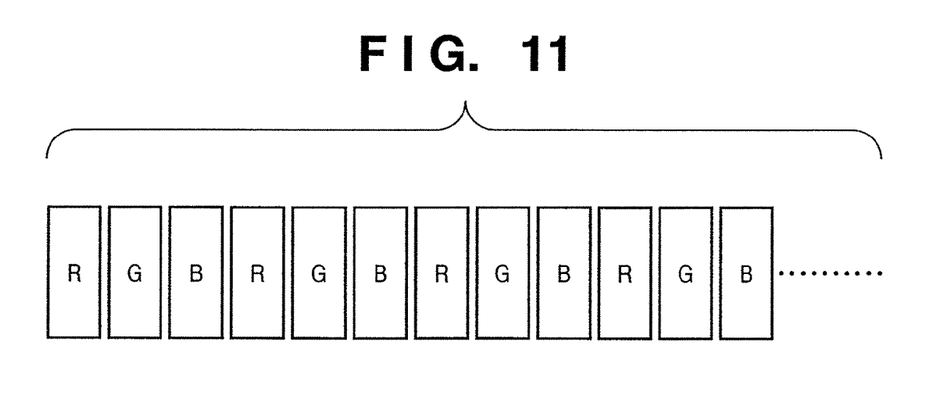
FIG. 11 is a view for explaining another color CIS in which one pixel is divided into three, R, G, and B colors in the main scanning direction.

As a color CIS which reads 600 dpi at the equal magnification, CISs as shown in FIGS. 10 and 11 are proposed. FIG. 10 shows an example of the sensor pixel array of the color CIS. One 42-μm pixel corresponding to 600 dpi is divided into three in the subscanning direction, and three R, G, and B reading lines are formed parallel to each other at a pixel pitch of 1/3.

There is also proposed an in-line sensor in which one 42-μm pixel is divided into three in the main scanning direction and pixels are aligned in order of R, G, B, R, G, B, ..., as shown in FIG. 11.

These two sensors, however, suffer the following problems.

The area of the reading aperture is 1/3 the pixel per color, and the sensitivity is low. As a result, the light quantity of a light source must be directly increased, which poses a problem in increasing a speed of 30 sheets/min or more in a copying machine.

The reading position shifts every 1/3 pixel in the subscanning direction or main scanning direction in accordance with R, G, and B color components, and correction processing for alignment must be executed. Assuming that a G component exists at the center, R and B components undergo alignment processing using linear interpolation. Since linear interpolation is smoothing processing, the MTFs of the R and B components become lower by about 30% than that of the G component.

This leads to a blurred image, and the black character determination unit of the color copying machine tends to detect a thin black line as another color owing to the MTF difference between the R, G, and B components of the image. The color copying machine having the black character determination function cannot determine a black character at high precision, and the qualities of black characters and thin lines on a printed image are low.

Especially in the copying machine, the image quality is most important in reading at the equal magnification of 100%, and then important in reading within the range of 70% to 140%. For this reason, the MTF difference between R, G, and B components is undesirable in reading at the equal magnification.

In an existing color 3-line CCD for a reduction optical system, the interval between R, G, and B reading lines is an integer multiple of one pixel such as a pitch of four or two pixels. In reading at the equal magnification, read data of respective colors are stored in a line memory and read out with a shift corresponding to the line interval. Only this processing can realize reading position correction processing.

A larger line interval, however, causes large color misregistration due to mechanical vibrations. Similar to the MTF difference, a thin black line is colored and leads to erroneous black color determination. Hence, the line interval is ideally one line. This also applies to a color CIS.

A general color CCD for a reduction optical system has R, G, and B reading aperture lines formed parallel to the main scanning direction. The color CCD, comprises two analog shift registers for charge transfer/reading in correspondence with each aperture line, i.e., a total of six analog shift registers. These analog shift registers do not pose any problem in the reduction optical system which uses only one color CCD.

In the color CIS, however, 16 color CCD chips are aligned in the main scanning direction. The use of similar color CCDs results in 6×16=96 reading outputs. Wiring and an analog processor circuit for processing the outputs become bulky.

In the pixel structure of the CIS, 468 pixels are arranged on one chip of a CCD reading element for each color. If 16 chips are aligned, 468×16=7,488 pixels are arranged in the main scanning direction. For example, to read an A4-size document in the longitudinal direction at 60 dpi, there is proposed a structure in which the pixel pitch between pixels on each chip in the main scanning direction is decreased at the end, instead of an equal pixel pitch.

A change in pixel pitch does not generate any problem when the CIS having this structure reads a document such as a printing paper sheet having a document image with no periodicity. When a document image such as dotted printed matter with periodicity is read, a change in pitch at the end of the CCD reading element with respect to the spatial frequency of the document image generates moire, and the density changes depending on the phase.

The black character determination unit of a color copying machine adopts an image area separation technique to check whether an area in process is a dotted image or character area. Also in this case, the pixel pitch is desirably equal.

SUMMARY OF THE INVENTION

The present invention has been made to overcome the conventional drawbacks, and has as its object to provide an optimum structure of a color CIS for a high-speed copying machine. More specifically, it is an object of the present invention to simultaneously rationally meet conditions: to realize high-speed reading while keeping a high S/N at high sensitivity, to enable reading without generating any MTF difference between R, G, and B colors, to minimize color misregistration caused by mechanical vibrations, to implement a color CIS with an appropriate circuit scale, and to accurately read a document having image periodicity.

To achieve the above object, according to the present invention, an image sensor is characterized by comprising image pickup element arrays on a plurality of lines that output signals of different colors for the respective lines, and a charge transfer unit on one line for sequentially reading out the signals of different colors from said image pickup element arrays on the plurality of lines by time division.

According to an aspect of the present invention, at least three color pixel signals from each of a plurality of image pickup element arrays are serially output such that each pixel signal of the at least three color pixel signals from each of the plurality of image pickup element arrays is next to different color pixel signal of the at least three color pixel signals from each of the plurality of image pickup element arrays and is sequentially output one after another on a single data line in a repetitive manner.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

A preferred embodiment according to the present invention will be described in detail below with reference to the accompanying drawings.

Figure 1:
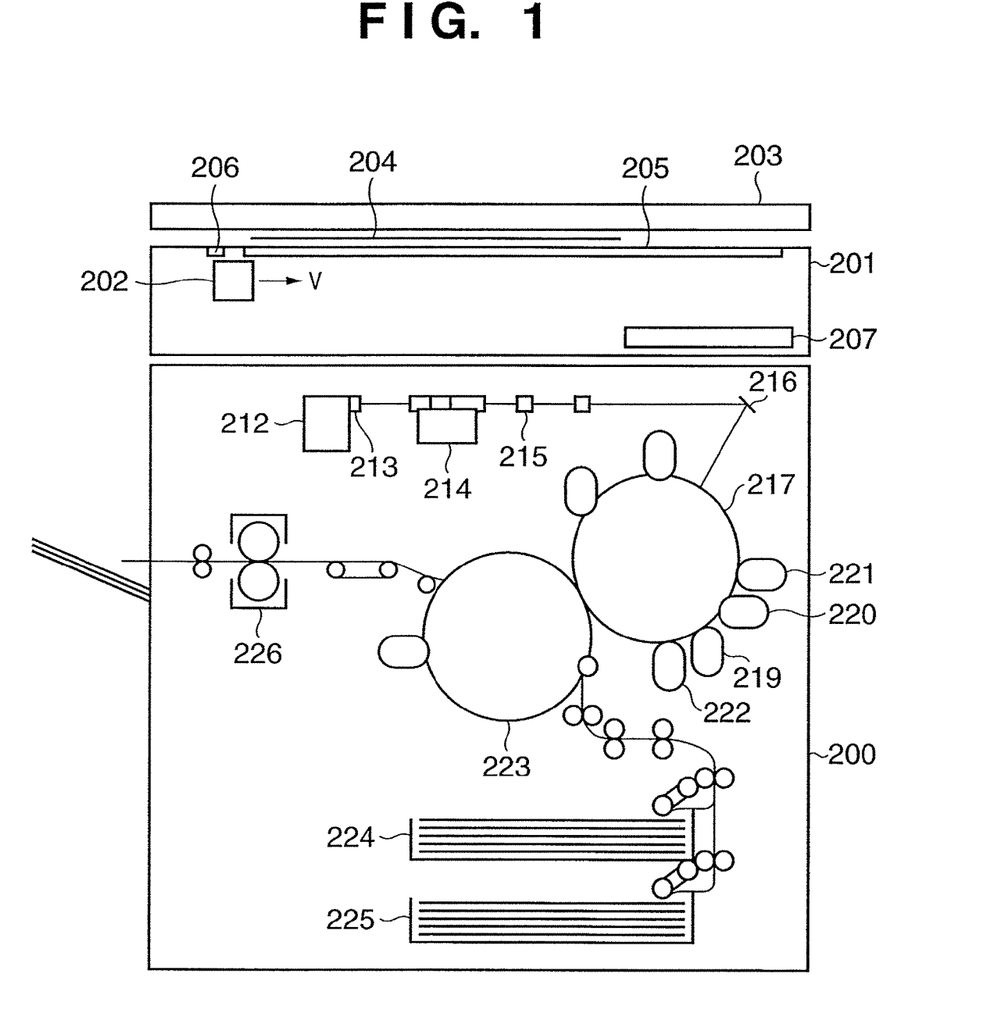
FIG. 1 is a sectional view showing an image forming apparatus according to an embodiment of the present invention.

FIG. 1 is a sectional view showing the arrangement of an image forming apparatus according to the embodiment of the present invention. In FIG. 1, reference numeral 201 denotes an image scanner section which reads a document and performs digital signal processing; and 200, a printer section which prints out on a sheet in full color an image corresponding to a document image read by the image scanner section 201.

Figure 2:
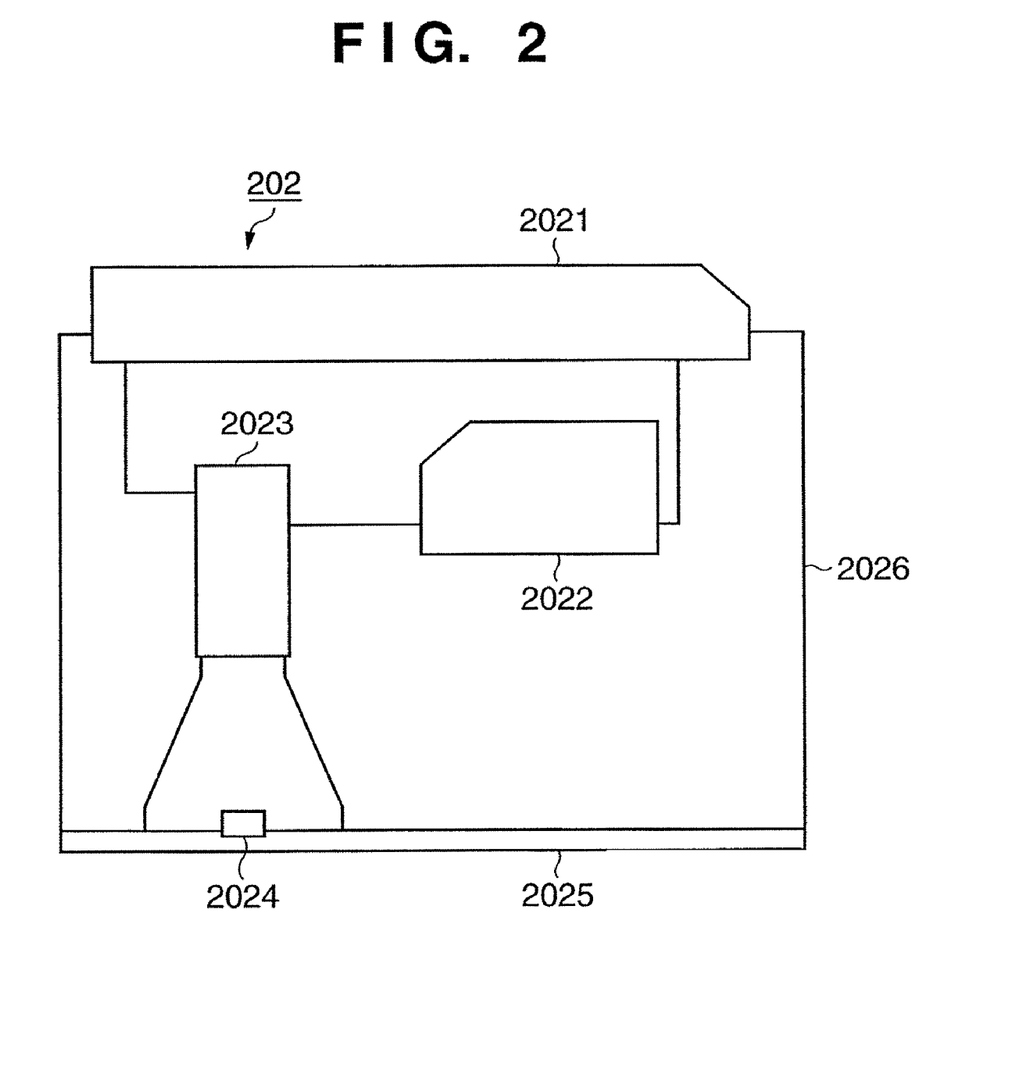
FIG. 2 is a sectional view showing a CIS.

A CIS module 202 incorporated in the image scanner section 201 will be explained. FIG. 2 is a sectional view of the CIS module 202, and FIG. 3 is an exploded perspective view thereof.

Figure 3:
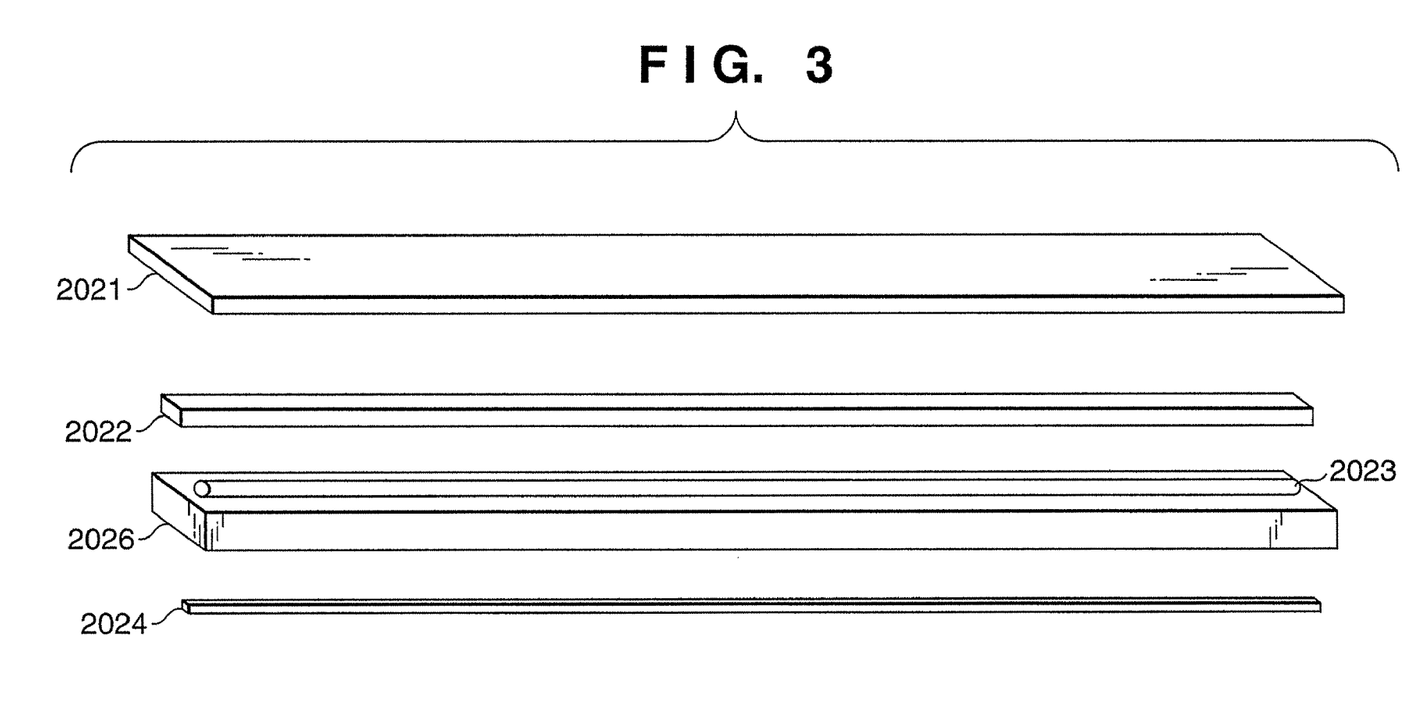
FIG. 3 is a perspective view showing the structure of the CIS.

As shown in FIGS. 2 and 3, the CIS module 202 is constituted by attaching, to a mold 2026, a cover glass 2021, an illumination light source 2022 made up of an LED and light guide, an equal-magnification imaging lens 2023 formed from a SELFOC lens or the like, a color line sensor 2024, and a board 2025 which holds the color line sensor 2024.

Figure 4:
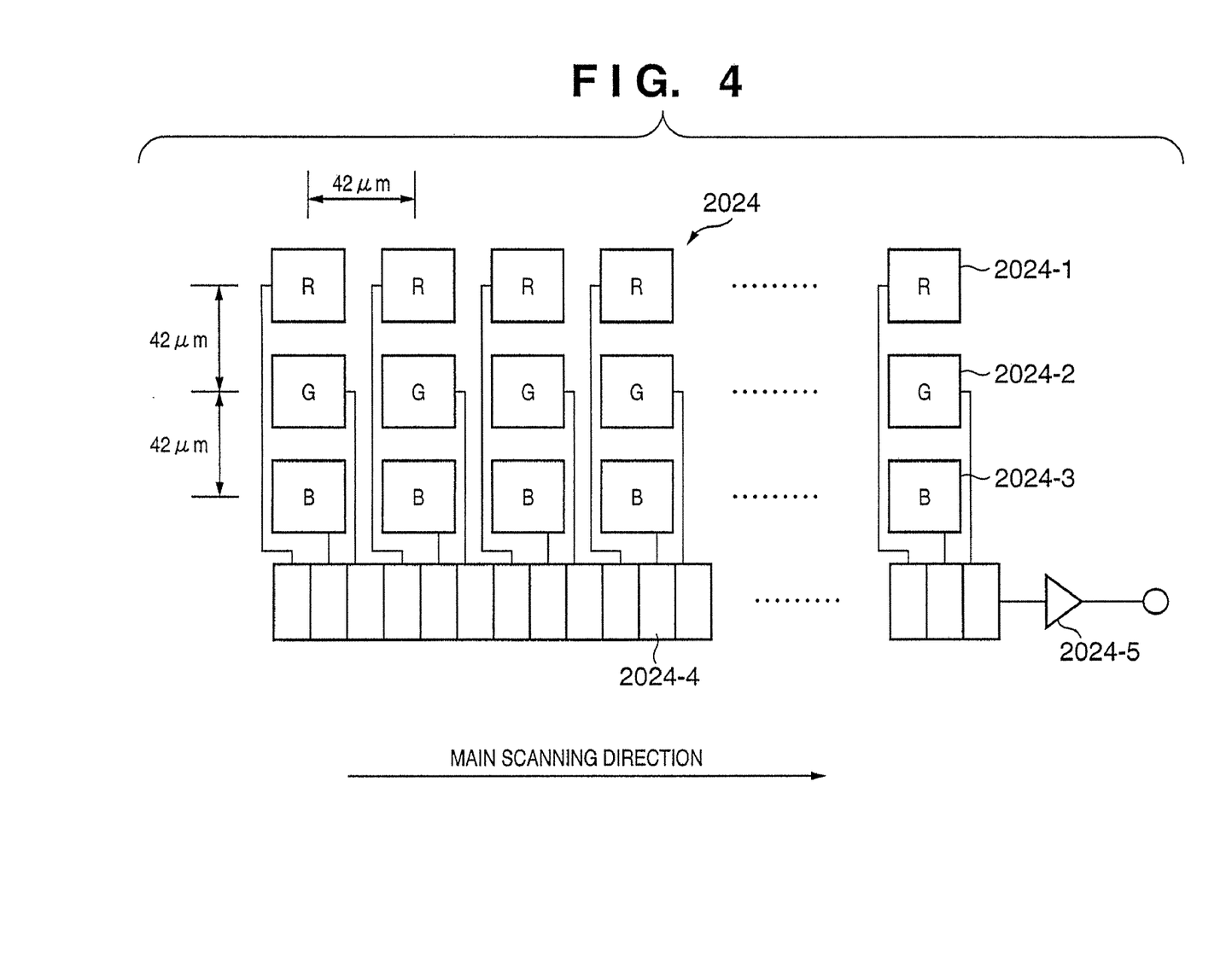
FIG. 4 is an enlarged view showing the pixel structure of a color CIS according to the embodiment of the present invention.

FIG. 4 is an enlarged view showing the microscopic portion of the color line sensor 2024 incorporated in the CIS module 202. Each rectangle represents a photodiode serving as a reading pixel. The color line sensor 2024 is used for equal-magnification reading at 600 dpi, and the size of the aperture of one pixel is about 34×34 μm.

Color filters of three, R, G, and B primary colors are formed on the photodiodes of the color line sensor 2024.

Reference numeral 2024-1 denotes a light-receiving element array (photosensor) prepared by aligning photodiodes which are covered with R filters and transmit a red wavelength component of visible light.

Reference numerals 2024-2 and 2024-3 denote light-receiving element arrays prepared by aligning corresponding photodiodes which are covered with G and B filters and transmit green and blue wavelength components of visible light. The three R, G, and B line form reading lines, which generate charges corresponding to incident light quantities on the photodiodes during an accumulation time.

Reference numeral 2024-4 denotes a CCD analog shift register serving as a charge transfer unit for transferring charges accumulated in the photodiodes 2024-1, 2024-2, and 2024-3; and 2024-5, an output amplifier for converting a charge signal into a voltage and outputting the voltage as a voltage output signal.

The light-receiving element arrays 2024-1, 2024-2, and 2024-3 having different optical characteristics on the three lines are arranged parallel to each other so as to read the same line of a document by the R, G, and B sensors. The CCD analog shift register 2024-4 is arranged adjacent and parallel to the B light-receiving element array 2024-3 outside the three light-receiving element arrays. The light-receiving element arrays 2024-1, 2024-2, and 2024-3 and the CCD shift register 2024-4 have a monolithic structure on a single silicon chip.

The photodiodes are arranged such that the pitch between pixels (distance between the centers of photodiodes) on each line in the main scanning direction is set to about 42 μm. Also, the photodiodes are arranged such that the interval between lines is set to about 42 μm.

Figure 5:
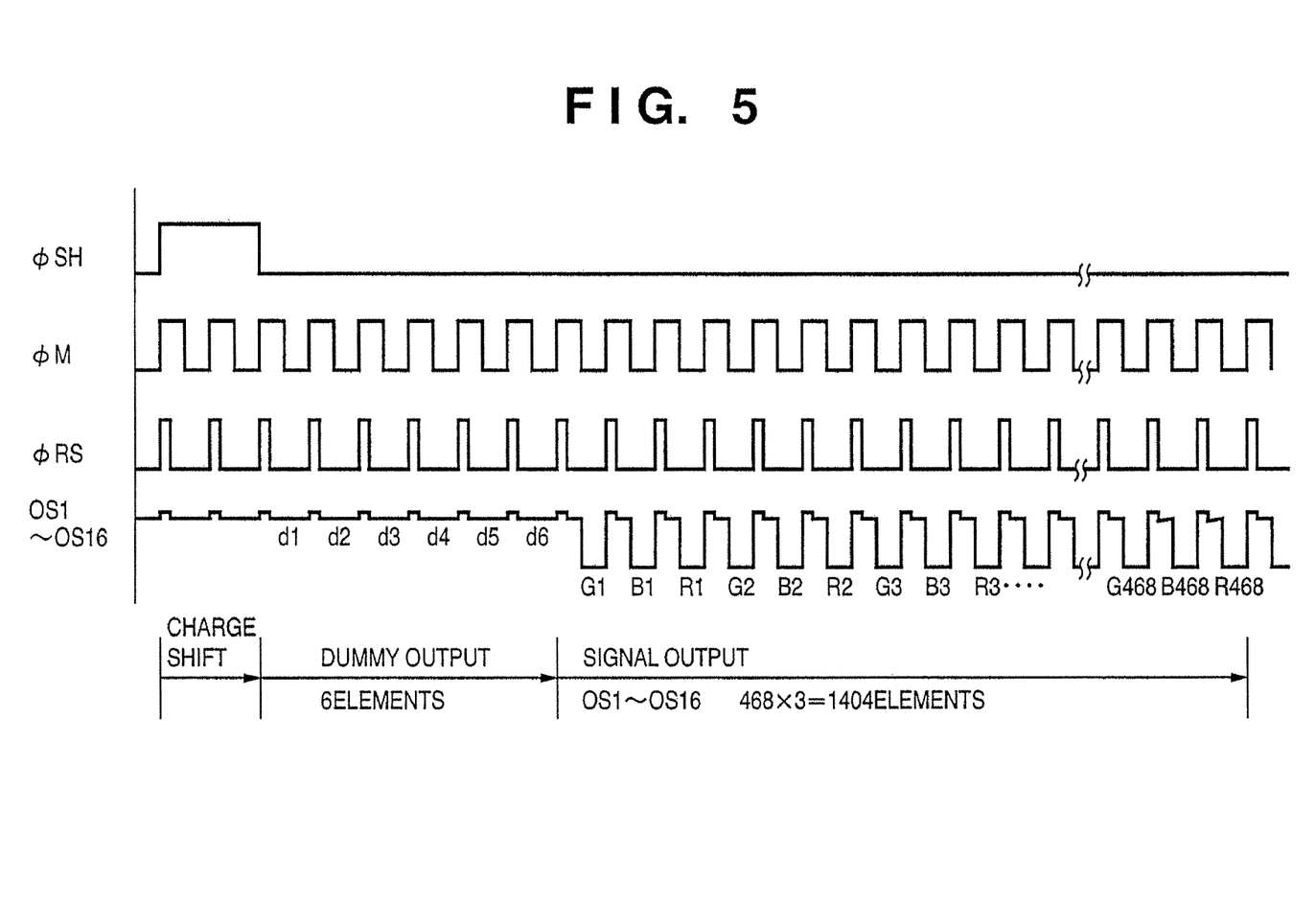
FIG. 5 is a timing chart for explaining an image signal reading timing from a CCD according to the embodiment of the present invention.

FIG. 5 is a timing chart for explaining the readout timing of an image signal from the color CIS.

Charges of R, G, and B colors for one line that are accumulated in the photodiodes 2024-1, 2024-2, and 2024-3 during one line period (e.g., 350 μs) are transferred at once to the CCD analog shift register 2024-4 serving as a charge transfer unit in response to a shift pulse ΦSH at the timing of the start of the next line.

The charges which have been output to the CCD analog shift register 2024-4 and correspond to the respective pixels are sequentially transferred every pixel to the output amplifier 2024-5 in response to a charge transfer clock ΦM. The charges are converted into a voltage by the output amplifier 2024-5 and output as a voltage output signal. After the charge transfer unit 2024-4 transfers charges to the output amplifier 2024-5, the charge transfer unit 2024-4 is reset by a reset pulse ΦRS.

First, dummy signals d1, d2, . . . , d6 are read out. Then, effective signals are read out for 468 pixels of each color in repetitive order of green, blue, and read: G1, B1, R1; G2, B2, R2, . . . , G468, B468, and R468.

Signals are read out at these timings because the CCD analog shift register on one line common to the three light-receiving element arrays transfers charges of three colors in this embodiment.

Figure 6:
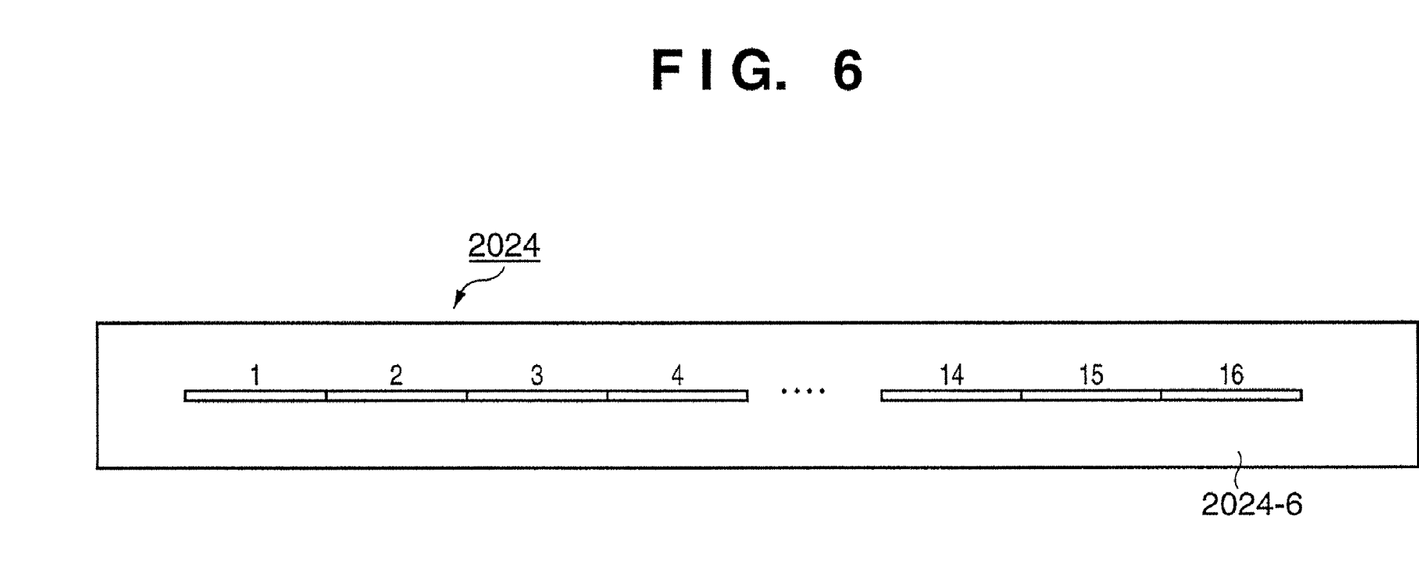
FIG. 6 is a view macroscopically showing the color CIS.

FIG. 6 is a view macroscopically showing the color line sensor 2024.

Sixty sensor chips are aligned on a board 2024-6. Signals are output from the respective sensor chips, and 16ch signals are simultaneously read out in correspondence with the chips. The readout 16 ch signals are subjected to gain offset adjustment by an analog signal processing unit 101 (to be described later), and converted into digital signals by an internal A/D converter. Since each sensor chip outputs only 1 ch, the number of reading output channels can be decreased even with a plurality of sensor chips, compared to the prior art. Wiring and an analog processor circuit for processing output image signals can be simplified.

Figure 7:
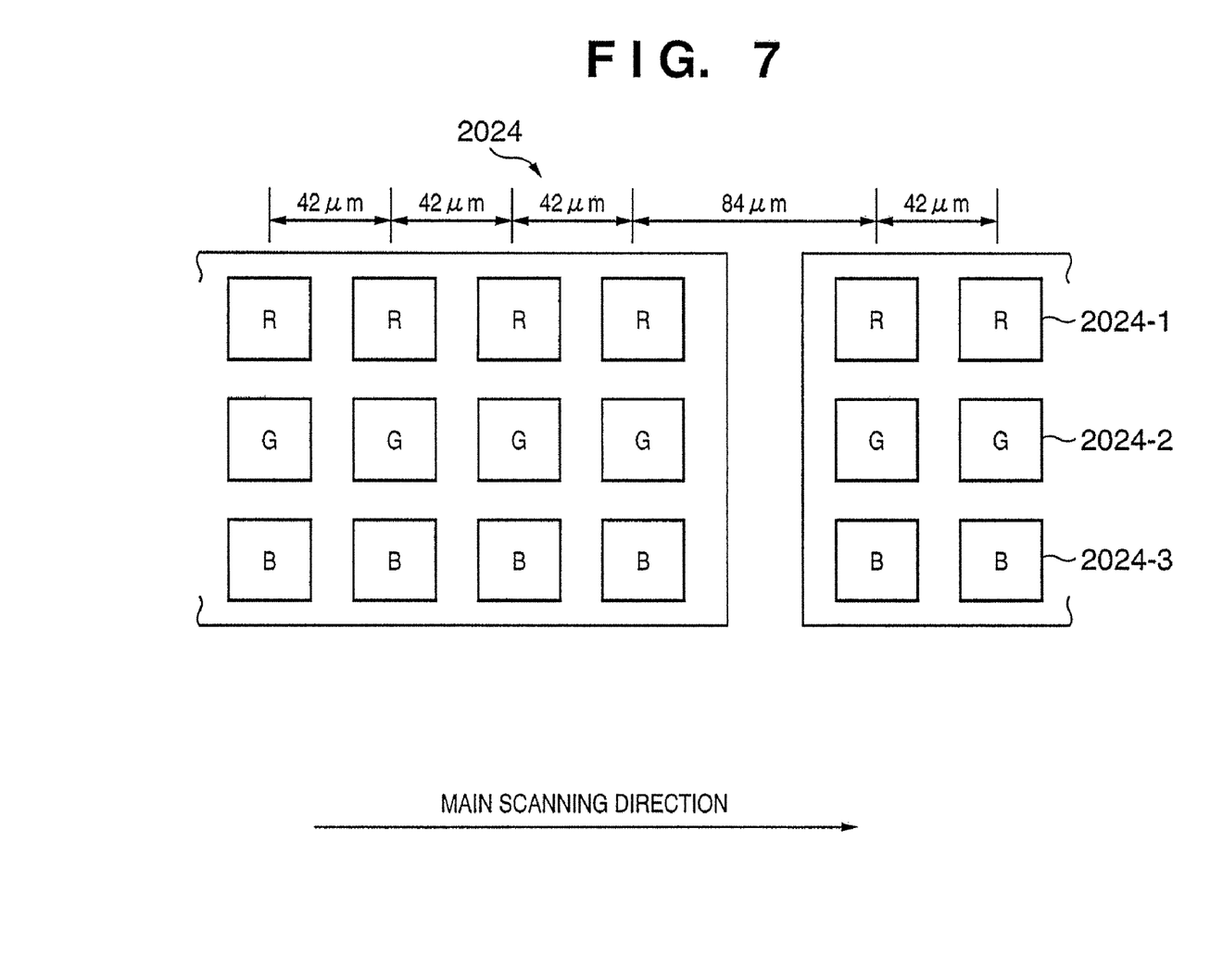
FIG. 7 is a view for explaining the joint between CCD chips according to the embodiment of the present invention.

FIG. 7 is an enlarged view showing joints between the 16 sensor chips. In FIG. 7, the charge transfer unit 2024-4 is not illustrated. In this embodiment, the pixel pitch (distance between the centers of photodiodes) between pixels at the ends of adjacent sensor chips is designed double a normal pitch (pixel pitch within a single sensor chip).

In this arrangement, one pixel is omitted at the joint, but can be rationally interpolated by preceding and subsequent pixels. Even an image such as a dotted image with a periodic property can be accurately read without generating moire or a density change.

The operation of the overall apparatus will be explained. In the image scanner section 201 of FIG. 1, a document 204 set on a document glass (platen) 205 and pressed by a document press plate 203 is irradiated with light from the illumination light source 2022 incorporated in the CIS module 202 shown in FIG. 2. The light reflected by the document 204 forms an image on the color line sensor 2024 via the lens 2023 in FIG. 2.

The color line sensor 2024 separates optical information of the document into red (R), green (G), and blue (B) color components to read the document in full color. The color line sensor 2024 outputs the R, G, and B color signals to a signal processor 207.

Each of the reading sensor lines of the respective color components in the color line sensor 2024 is formed from 7,500 pixels. The color line sensor 2024 can therefore read at a resolution of 600 dpi an A3-size document 297 mm in the widthwise direction, which is the maximum size among documents set on the document glass 205.

The CIS module 202 mechanically moves at a velocity V in a direction (subscanning direction) perpendicular to the electrical scanning direction (main scanning direction) of the reading sensor line, thereby scanning the entire surface of the document 204.

Figure 8:
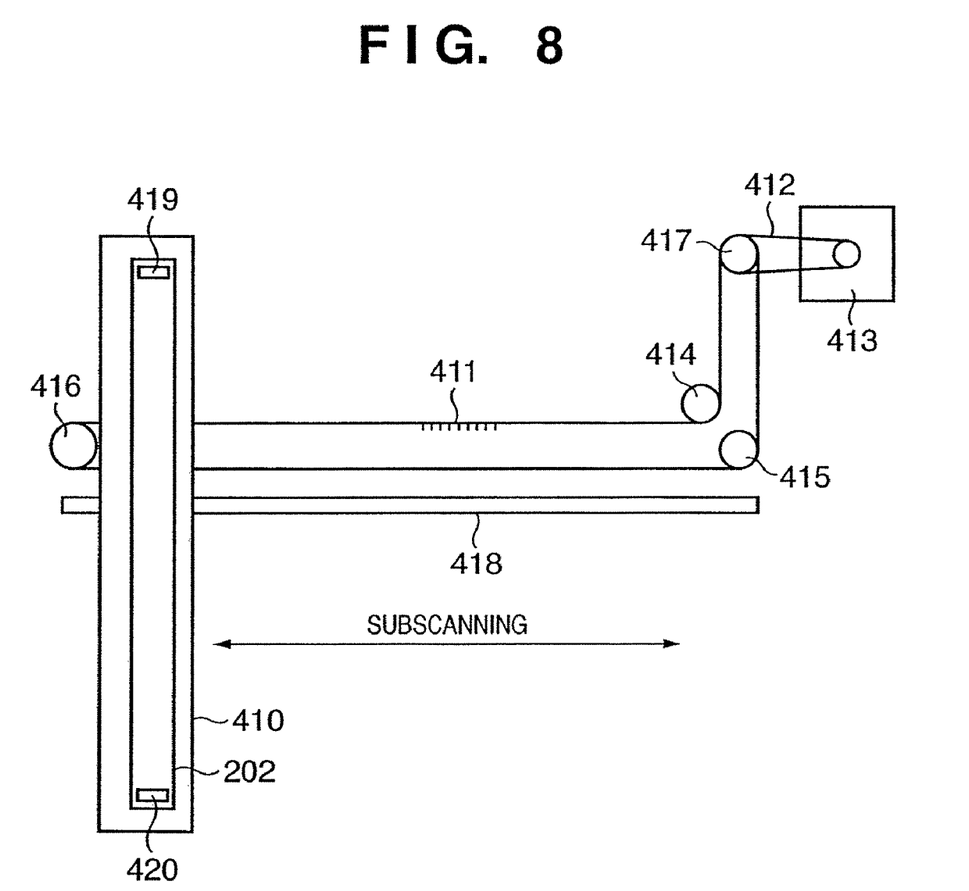
FIG. 8 is a view for explaining subscanning operation.

FIG. 8 is a top view showing the image reading apparatus of the embodiment for explaining an arrangement which performs subscanning operation.

The color CIS 202 is stored in a resin carriage 410. Slide members 419 and 420 are attached to the two ends of the color CIS 202, and pressed against the platen glass by spring members (not shown) incorporated in the carriage 410.

The movement of the carriage 410 is restricted by a linear guide 418 so as to move in only the subscanning direction. A timing belt 411 is connected below the carriage 410. As the timing belt 411 moves, the carriage 410 moves interlockingly.

A stepping motor 413 transmits its power to the carriage 410 via the timing belt 411, a timing belt 412, and pulleys 414, 415, 416, and 417 under the control of a CPU 131 (to be described later) serving as a control means. Then, the carriage 410 moves in the subscanning direction.

Referring back to FIG. 1, a standard white plate 206 is white with an almost uniform reflecting characteristic to visible light. The standard white plate 206 corrects shading of R, G, and B data read by the color line sensor 2024. Shading correction is performed for document reading data output from the R, G, and B sensors 2024-1, 2024-2, and 2024-3 on the basis of data obtained by reading the standard white plate 206.

The image signal processor 207 electrically processes a read signal, separates it into magenta (M), cyan (C), yellow (Y), and black (Bk) components, and sends them to the printer section 200. One of M, C, Y, and Bk components is transferred to the printer section 200 every document scanning (scan) of the image scanner section 201. By a total of four document scanning operations, image data of one sheet is printed out.

In the printer section 200, M, C, Y, and Bk image signals from the image scanner section 201 are sent to a laser driver 212. The laser driver 212 modulates and drives a semiconductor laser 213 in accordance with the image signals. A laser beam emitted by the semiconductor laser 213 scans a photosensitive drum 217 via a polygon mirror 214, f-θ lens 215, and mirror 216.

The developing device is made up of a magenta developing unit 219, cyan developing unit 220, yellow developing unit 221, and black developing unit 222. The four developing units alternately contact the photosensitive drum 217 to develop M, C, Y, and Bk electrostatic latent images formed on the photosensitive drum 217 with corresponding toners.

A transfer drum 223 holds a sheet fed from a sheet cassette 224 or 225 around the transfer drum 223 itself, and a toner image developed on the photosensitive drum 217 is transferred to the sheet.

After toner images of four, M, C, Y, and Bk colors are sequentially transferred, the sheet is discharged via a fixing unit 226.

The image signal processor 207 will be described.

Figure 9:
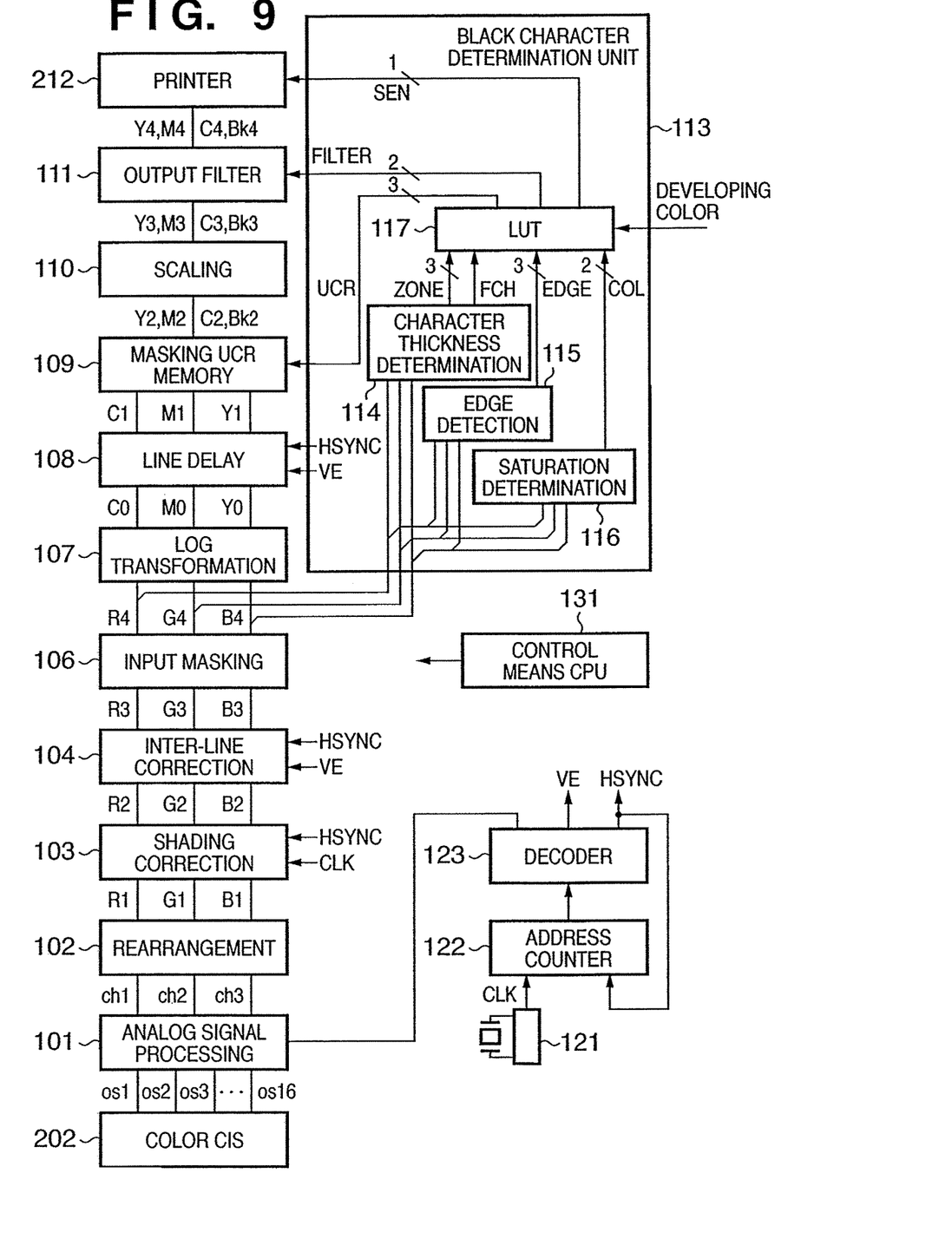
FIG. 9 is a block diagram showing image processing according to the embodiment of the present invention.

FIG. 9 is a block diagram showing the flow of an image signal in the image signal processor 207 of the image scanner section 201 according to the embodiment.

The image signal processor 207 executes various processes using a register and memory under the control of the control means 131 implemented by a CPU.

A clock generator 121 generates clocks for each pixel, and a main scanning address counter 122 counts clocks from the clock generator 121 to generate a pixel address output of one line. A decoder 123 decodes the main scanning address from the main scanning address counter 122, and generates a line unit sensor driving signal such as a shift pulse or reset pulse, a signal VE representing an effective area in a I-line reading signal output from the color image sensor, and a line sync signal HSYNC. The main scanning address counter 122 is cleared by a signal HSYNC, and starts counting the main scanning address of the next line.

Image signals OS1 to OS16 output from the CIS module 202 are input to the analog signal processing unit 101. The analog signal processing unit 101 analog-multiplexes the signals so as to assign OS1 to OS6 to chi, OS7 to OS12 to ch2, and OS13 to OS16 to ch3. After gain adjustment and offset adjustment, the analog signal processing unit 101 converts the signals into an 8-bit digital image signal.

The 8-bit digital image signal output from the analog signal processing unit 101 is separated into signals of R, G, and B color components by a rearrangement unit 102. A shading correction unit 103 performs known shading correction using a reading signal of a standard white plate 211 for the signals of the respective colors.

An inter-line correction unit 104 corrects spatial shifts between the shading-corrected color signals in the subscanning direction.

In the CIS module 202 used in this embodiment, as shown in FIG. 4, the three light-receiving element arrays 2024-1, 2024-2, and 2024-3 of the color image sensor 2024 are arranged parallel to each other at a predetermined distance (42 μm equal to the size of the aperture of one pixel in the subscanning direction). Since the R, G, and B lines shift from each other by one pixel in the subscanning direction, data at different positions are simultaneously read in the subscanning direction. The image data must be corrected to the same position, and thus a known so-called 3-line correction technique is adopted for correction.

The 3-line correction is employed as an essential technique in the use of an existing color 3-line CCD. In general, an image signal (in this case, a B signal) of a previously read line is accumulated in a memory and combined with image signals (in this case, R and G signals) of subsequently read lines. The R and G color signals are delayed by lines in the subscanning direction with respect to the B signal so as to adjust the R and G color signals to the B signal, thereby correcting the spatial shift.

In the color CIS used in the embodiment, the interval between the three, R, G, and B reading lines is one pixel pitch which is an integer multiple of the size of one pixel in the subscanning direction. This can simplify correction processing. As far as the interval is an integer multiple of the size of one pixel in the subscanning direction, the lines may be arranged at an interval of two or three times (two or three pixels).

An output from the inter-line correction unit 104 is input to an input masking unit 106. In order to transform the RGB signal reading color space read by the CIS module 202 into an NTSC standard color space, the input masking unit 106 executes the following matrix calculation:

$$\begin{bmatrix} R4 \\ G4 \\ B4 \end{bmatrix} = \begin{bmatrix} a11 & a12 & a13 \\ a21 & a22 & a23 \\ a31 & a32 & a33 \end{bmatrix} \begin{bmatrix} R3 \\ G3 \\ B3 \end{bmatrix}$$

Luminance signals R4, G4, and B4 output from the input masking unit 106 are converted into density signals CO, MO, and YO by a light quantity/density converter (LOG transformation unit) 107 formed from a lookup table ROM.

A line delay memory 108 delays the image signals CO, MO, and YO by lines until determination signals UCR, FILTER, SEN, and the like generated by a black character determination unit 113 (to be described later) from the signals R4, G4, and B4. As a result, the image signals C1, M1, and Y1 and a black character determination signal for the same pixel are simultaneously input to a masking UCR circuit 109.

The masking UCR circuit 109 extracts a black signal (Bk) from the input three primary color signals Y1, M1, and C1. The masking UCR circuit 109 performs calculation of correcting color smear of a recording coloring material in a printer 212. Then, the masking UCR circuit 109 sequentially outputs signals Y2, M2, C2, and Bk2 with a predetermined bit width (8 bits) every reading operation.

A main scanning scaling circuit 110 performs enlargement/reduction processing in the main scanning direction for an image signal and black character determination signal by known interpolation calculation.

A spatial filter processing unit (output filter) 111 switches edge emphasis and smoothing processing on the basis of a 2-bit signal FILTER from a LUT 117, and outputs the resultant signal to the printer 212.

The black character determination unit 113 will be explained. The basic operation is to determine whether an area of interest in a read image is a character/line image area or a dotted image area. If the area is determined to be a character/line image area, the UCR 109 increases the black amount to make black clear. The output filter 111 emphasizes the edge, and the printer 212 switches the number of printing lines to be output to a fine-image setting and prints a sharp, clear character/line image. If the area is determined to be a dotted area, the filter 111 executes filtering so as to blur dots, and the printer 212 switches the number of printing lines for higher tone level reproducibility.

The black character determination unit 113 is disclosed in detail in Japanese Patent Laid-Open No. 7-203198 filed by the present applicant. A character thickness determination unit 114 determines the thickness of a character/line image portion in an image. An edge detection unit 115 obtains edge information of the character/line image, and a saturation determination unit 116 attains saturation information.

Then, 4-bit determination signals ZONE and FCH from the character thickness determination unit 114, a 3-bit determination signal EDGE from the edge detection unit 115, and a 2-bit determination signal COL from the saturation determination unit 116 are input to the LUT (lookup table) 117. In accordance with these 9-bit input signals, the LUT 117 outputs a 3-bit signal UCR for controlling the masking UCR unit 109, a 2-bit signal FILTER for controlling the output filter 111, and a 1-bit signal SEN for controlling the printer 212.

In this way, the masking UCR unit 109, output filter unit 111, and printer 212 are appropriately controlled in accordance with the determination results of the character thickness determination unit 114, edge detection unit 115, and saturation determination unit 116. Proper image processing can be achieved in accordance with whether the current area is a black character, i.e., character/line image area or a dotted image area, and a clear printing result can be obtained.

The above-described embodiment of the present invention has proposed an optimum structure of a color CIS for a high-speed copying machine. With the use of the proposed color CIS, high-speed reading can be realized with high sensitivity and high S/N. Further, reading with high reproducibility of a thin black character line can be performed without generating any MTF between R, G, and B colors.

Since the pitch between lines is decreased, color misregistration by mechanical vibrations can be minimized. An image having periodicity can also be accurately read, and these improvements can be implemented with a proper circuit scale.

The present invention can be applied to a system constituted by a plurality of devices or an apparatus formed from one device.

As has been described above, this embodiment can realize high-speed reading at high sensitivity and high S/N by using a color contact image sensor.

The present invention is not limited to the above embodiments and various changes and modifications can be made within the spirit and scope of the present invention. Therefore, to apprise the public of the scope of the present invention the following claims are made.

What is claimed is:

1. An image sensor comprising:
a plurality of image pickup element arrays arranged parallel to each other at a predetermined pitch, wherein each of the image pickup element arrays is configured to output a pixel signal corresponding to a different color; and
a CCD shift register arranged adjacent and parallel to one of the image pickup element arrays, wherein the CCD shift register is configured to:
receive at least three color pixel signals from the plurality of image pickup element arrays in response to a shift pulse, and
serially output the received at least three color pixel signals from each of the plurality of image pickup element arrays such that each pixel signal of the at least three color pixel signals from each of the plurality of image pickup element arrays is next to a different color pixel signal of the at least three color pixel signals from each of the plurality of image pickup element arrays and is sequentially output one after another on a single data line in a repetitive manner in response to a transfer pulse; and
an output amplifier configured to amplify the pixel signals serially output from said CCD shift register.

2. The image sensor according to claim 1, wherein the plurality of image pickup element arrays and the CCD shift register have a monolithic structure on a single silicon chip.

3. The image sensor according to claim 1, wherein the at least three color signals include R (red), G (green) and B (blue) color signals.

4. An imaging apparatus comprising:
a plurality of image pickup element arrays arranged parallel to each other at a predetermined pitch, wherein each of the image pickup element arrays is configured to output a pixel signal corresponding to a different color;
a CCD shift register arranged adjacent and parallel to one of the image pickup element arrays, wherein the CCD shift register is configured to receive at least three color pixel signals from the plurality of image pickup element arrays in response to a shift pulse, and serially output the received at least three color pixel signals from each of the plurality of image pickup element arrays such that each pixel signal of the at least three color pixel signals from each of the plurality of image pickup element arrays is next to a different color pixel signal of the at least three color pixel signals from each of the plurality of image pickup element arrays and is sequentially output one after another on a single data line in a repetitive manner in response to a transfer pulse;
an output amplifier configured to amplify the pixel signals serially output from said CCD shift register;
a light source which illuminates a document;
an imaging lens which forms an image of the document on said image pickup element at an equal magnification, and
a moving unit configured to move said image sensor relative to the document.

5. The imaging apparatus according to claim 4, wherein the at least three color signals include R (red), G (green) and B (blue) color signals.

6. The imaging apparatus according to claim 5, further comprising a signal processing unit configured to read the R, G and B color signals and separate said R, G and B color signals into magenta (M), cyan (C), yellow (Y) and black (Bk) components, wherein the Bk component is controlled based on whether or not an area of interest in a read image includes printed matter with periodicity.

7. An image sensor comprising:
a plurality of image pickup element arrays each corresponding to a plurality of colors and arranged parallel to each other at a predetermined pitch, wherein each of the image pickup element arrays has image pickup elements which generate charges corresponding to incident light quantities;
a shift register to which each of the image pickup elements included in each of the image pickup element arrays is discretely connected, wherein the shift register is configured to receive charges generated in the image pickup elements included in each of the plurality of image pickup element arrays in response to a shift pulse, and serially output the received charges in response to a transfer pulse; and
an output amplifier configured to amplify the charges serially output from said shift register.

8. The image sensor according to claim 7, wherein the plurality of colors are R (red), G (green) and B (blue).

9. The image sensor according to claim 7, wherein the shift register receives charges generated in the image pickup elements included in each of the plurality of image pickup element arrays at once in response to a shift pulse, and serially outputs the charge corresponding to the plurality of colors for each one charge.

* * * * *